March 1, 1932. H. G. TRAVER 1,847,733
TRACK RAIL SUPPORT
Original Filed May 14, 1929
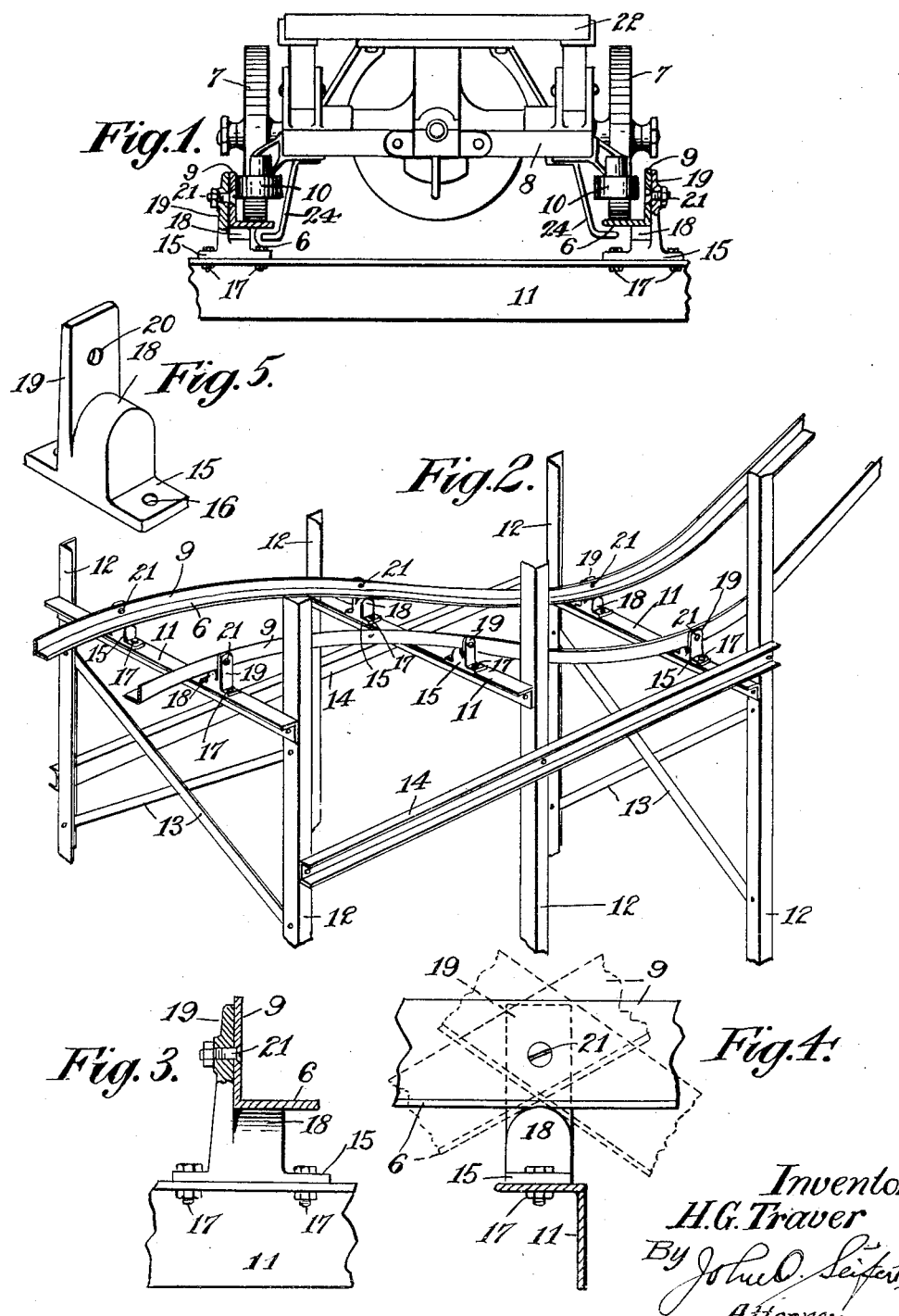
Inventor
H.G. Traver
By John D. Seifert
Attorney Patented Mar. 1, 1932

1,847,733

UNITED STATES PATENT OFFICE

HARRY G. TRAVER, OF BEAVER FALLS, PENNSYLVANIA

TRACK RAIL SUPPORT

Original application filed May 14, 1929, Serial No. 362,936. Divided and this application filed June 18, 1930. Serial No. 461,910.

This invention relates to track supporting structures of amusement rides, the present application being for subjects-matter divided out from my co-pending application filed May 14, 1929, Serial No. 362,936, and it is the principle object of the invention to provide means for supporting rails of a track at any desired angle in a vertical plane and of such design so as to be of universal use at any point in an amusement ride without the necessity of changing the structure thereof to meet any special requirement.

The embodiment of the invention comprises a saddle member having the rail engaging portion thereof of arcuate form in cross-section to support the tread portion of a track rail with means carried by the saddle and adapted to secure the rail to the saddle.

In the drawings accompanying and forming a part of this application Figure 1 is a sectional view of a track and my improved rail supporting means therefor showing a traction wheel supported truck and frame of a passenger carrying car thereon.

Figure 2 is a perspective view of the track and supporting structure therefor showing the track in an elevated position and the angular mounting of the track rails.

Figure 3 is an elevational view of a track rail supporting saddle and showing the manner of mounting the rail on the saddle.

Figure 4 is a view looking at the right of Figure 3 showing in dotted lines the different adjusted angular positions in which the track rail may be mounted thereon; and Figure 5 is a perspective view of a rail supporting saddle.

In carrying out the invention there is provided a track comprising parallel rails of angle shape in cross section with the angles of each rail facing each other, one angle portion 6 constituting the tread to tractionally support wheels 7 carried by a supporting truck 8 resiliently supporting a frame 22 adapted for the mounting of a passenger carrying car body thereon of any desired type, and is not shown as such car body forms no part of the present invention. The other angle portion 9 is extended at a right angle and vertical to the tread portion and adapted to be engaged by rollers 10 rotatably mounted on the wheel truck 8 in front and back of the car wheels to guide and maintain the cars on the track. The track rails are supported by ties or ledgers 11, in the present instance of angle iron, supported in any desirable manner depending upon whether the section of the track is flat on the ground or elevated from the ground as illustrated in the present application. In the latter case the ledgers are supported at the opposite ends by and extend transversely between columns 12 reinforced by braces 13, the ledgers being supported with one angle portion thereof abutting an angle portion of the columns 12 and the other angle portion of the ledgers extending at a right angle thereto and supporting the track rails, as shown in Figure 2. The columns 12 are further kept in alinement by channel bars 14 and the columns are supported upon a suitable base or foundation.

To impart novelties and thrills to the patrons of the ride the track rails are arranged with dips and rises. To effect an easy travel of the cars from a dip or downwardly inclined section of the track to a rising or upwardly inclined section as well from said sections to a level section and from a level section to said inclined sections the track rails are curved in a vertical plane. To facilitate the laying and mounting of the track rails and compensate for the variations in the track rails due to the inclined, curved and level sections of the track the rail supports for mounting the rails upon the supporting structure are arranged to universally adapt themselves to such variations in the track rails by constructing the rail engaging surface of the supports of convex or arcuate shape in cross section. In the embodiment of the invention illustrated the rail supports are in the form of saddle members comprising a base portion 15 arranged with perforations 16 for securing said members to the ledgers 11 by screws or bolts engaging said perforations and alined perforations in the ledgers, as shown at 17. The rails are supported on the saddle members by engaging the under surface of the tread portion 6 of the rails upon the arcuate upper surface of a shoulder portion 18 extending from the base portion with an ear portion 19 projecting from one side of the shoulder, which ear is arranged at the outer side when the saddles are mounted on the ledgers to support the opposed track rails and forms an angle with the arcuate shoulder 18 for engagement with the angle of the rails, as shown in Figures 1 and 3. It will be obvious that the rails may be adjusted to extend at any angle in an arc of approximately 180 degrees, as shown in dotted lines in Figure 4, and the rails are secured in the adjusted position thereof by arranging the extended ears 19 with a perforation 20 for the engagement of headed screws of bolts 21 passing through alined perforations in the angle portions 9 of the rails, the heads being countersunk below the surface of the portions 9 to prevent interference thereof with the travel of the rollers 10 along said rail portions, and the bolts are secured by nuts engaged upon the thread portion extending from the outer side of ear 19, as shown in Figures 1 and 3.

The shoulder portion 18 is of less width than the tread portion 6 of the rails, so that the marginal edge of the tread will extend beyond the inner side of the saddle, as shown in Figure 3, for the engagement of safety shoes 24 extended from the supporting truck 8 should the car leave the track rails at the banked track sections. It will be obvious that there may be variations in the construction and arrangement of the rail supporting means without departing from the scope of the invention.

Having thus described my invention, I claim:

1. In an amusement ride, a track embodying parallel rails of angle shape in cross section, one angle portion of each rail constituting the tread, and saddle members fixed to a supporting structure having an arcuate surface for engagement by the under-surface of the rail treads and an ear extended beyond and at an angle to the arcuate surface relative to which the other angle portion of the rails is adapted to be juxtaposed and releasably secured thereto to maintain the rails on the saddles in different angular positions relative to the horizontal.

2. An amusement ride as claimed in claim 1, wherein the saddles are of less width than the rail treads whereby the free marginal portion of the treads extend beyond the arcuate surface of the saddle members to form a ledge for engagement below the same of a safety shoe carried by a car propelled along the track.

3. An amusement ride as claimed in claim 1, wherein the angle portions of the track rails extend from each other at a right angle and the ear of the saddle members extends at an angle to the arcuate portion to form a seat for the angle portions of the track rails.

4. In an amusement ride, a track embodying parallel rails of angular shape in cross section, and saddle members to support the rails in different angular positions relative to the horizontal, comprising a body portion arranged with a base to mount the members on a supporting structure, the upper surface of the body being of arcuate form for engagement with an angle portion of the track rails and an ear portion extending from the arcuate surface at one side of the body to form with the arcuate surface a seat for the angle portions of the track rails.

5. An amusement ride as claimed in claim 4, wherein the saddle ears and an angle portion of the rails extend in juxtaposed relation to each other and are arranged with alined perforations for the engagement of means to secure the track rails to the saddle members in engagement with the arcuate surface in different angular positions relative to the horizontal.

6. In an amusement ride, a track structure comprising parallel rails of angle shape in cross section, one angle portion of each rail constituting the tread thereof, and saddle members having an arcuate surface for engagement therewith of the tread portion of the rails with the free marginal portion of said rail portion extending beyond the sides of the saddle members, and the other angle portion of each rail extending at a right angle from the tread portion and adapted for the engagement of rollers carried by a car propelled along the tracks to guide and maintain the car on the track rails.

Signed at Beaver Falls, in the county of Beaver and State of Pennsylvania, this 10 day of June, 1930.

HARRY G. TRAVER.